UNITED STATES PATENT OFFICE.

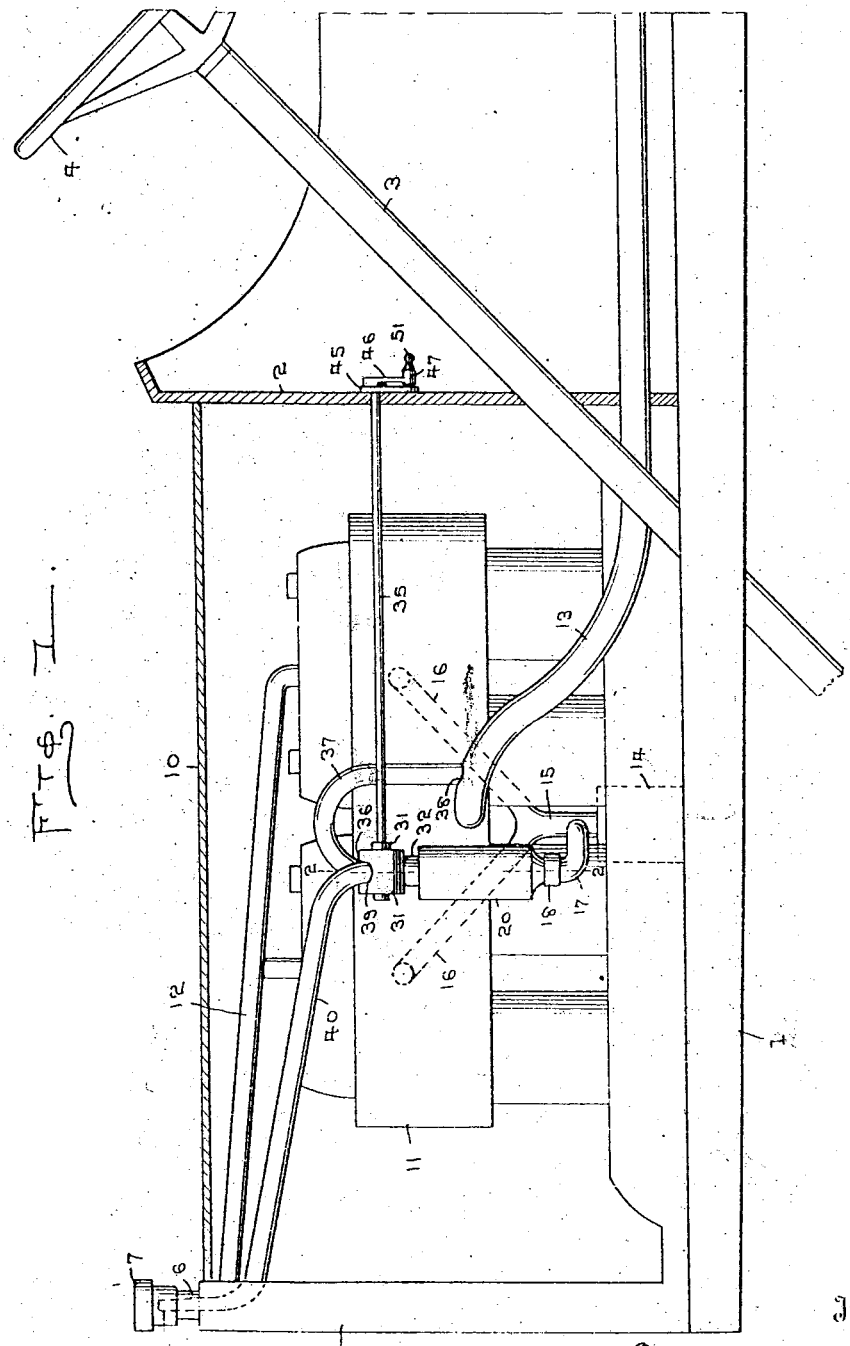

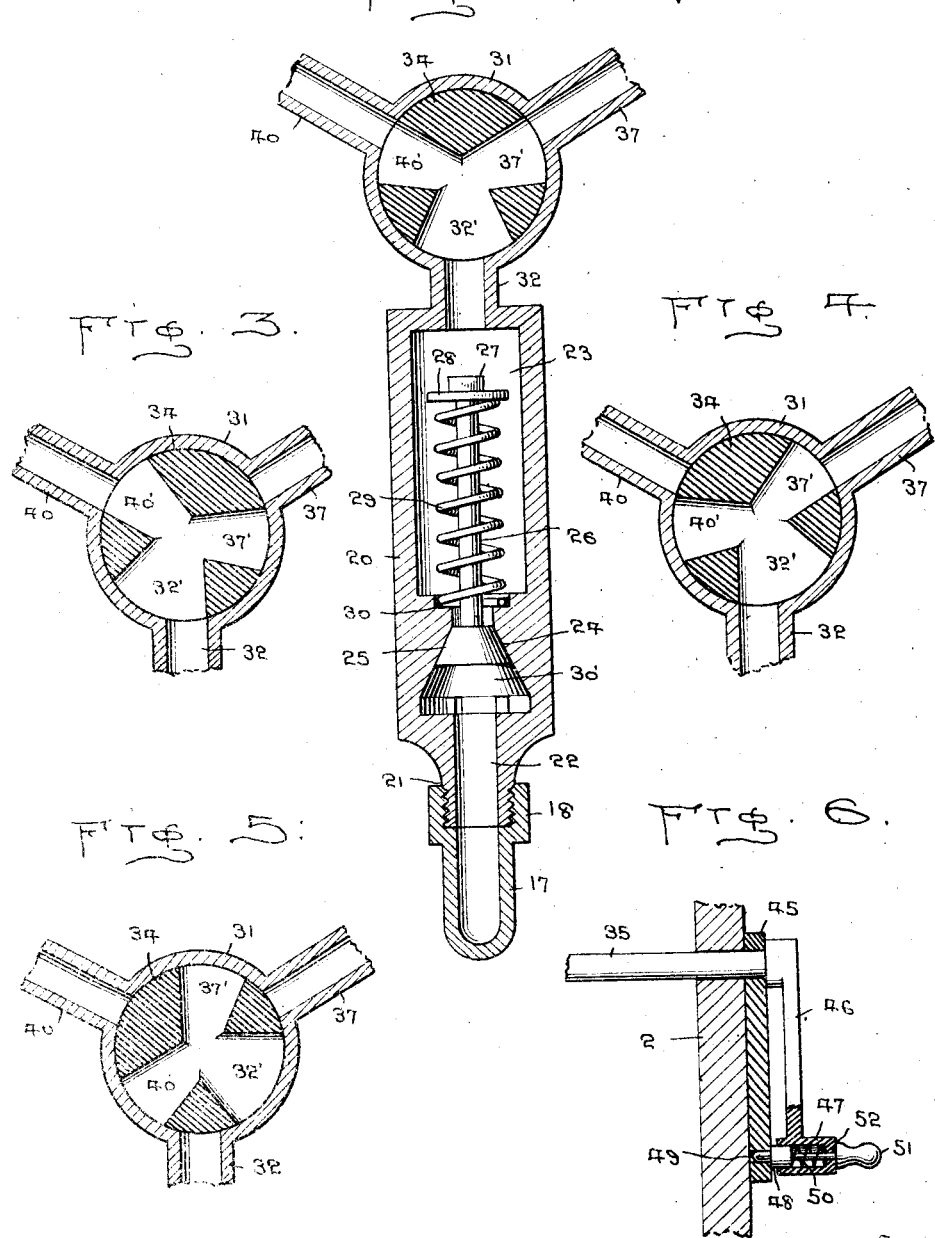

ALBERT ROSS UMBARGER, OF WALTON, INDIANA, ASSIGNOR OF ONE-HALF TO ARTHUR A. TRITT, OF WALTON, INDIANA.

GAS-SAVING APPLIANCE.

1,142,779.  Specification of Letters Patent.  Patented June 8, 1915.

Application filed January 15, 1914. Serial No. 812,246.

*To all whom it may concern:*

Be it known that I, the undersigned, ALBERT ROSS UMBARGER, a citizen of the United States, residing at Walton, in the county of Cass and State of Indiana, have invented certain new and useful Improvements in Gas-Saving Appliances; and I do hereby declare the following to be a full, clear, and exact description of the invention, such as will enable others skilled in the art to which it appertains to make and use the same.

This invention relates to gas saving appliances for internal combustion engines and more particularly to those in use upon automobiles, and has for one of its objects the provision of means for controlling the density of the fuel charge.

Another object of this invention is the provision of means for automatically supplying vapor or heated air, or both, automatically to the fuel charge.

A further object of this invention is the provision of means for determining the disposition of the vapor or heated air relative to the fuel charge. And a still further object of this invention resides in the provision of means for manually controlling the disposition of vapor or heated air, or both, for incorporating the same with the fuel charge, for preventing carbonization. And another object of this invention resides in the provision of means for automatically and intermittently supplying vapor or heated air, or both, and for automatically preventing the retrocession of the same through said automatic means.

These and other objects will more fully appear, and the nature of the invention more clearly understood by the construction, combination, and arrangement of the parts thereof as described in the following specification, defined in the appended claims and illustrated in the accompanying drawings, in which, Figure 1, is a side elevation, partly in section of the front portion of an automobile showing my device as applied to the automobile engine and in operative position. Fig. 2, is a vertical, sectional view taken on the line 2—2 of Fig. 1, showing the construction of the automatic valve and the manually operated valve forming part of my invention, the same showing the position of the manually operated valve for the admission of both vapor and heated air into the automatic valve chamber. Fig. 3, is a transverse, vertical, sectional view of the manually operated valve showing the same in the position for admitting vapor to the automatic valve chamber. Fig. 4, is a similar view to Fig. 3, excepting the valve is positioned for the admission of the heated air to the automatic valve chamber. Fig. 5, is a similar view to Figs. 3 and 4 excepting the valve is positioned for closing all of the ports. Fig. 6, is a fragmentary, sectional, end view of the dash board of the automobile showing the indicator plate thereon, and the association therewith of the handle of the operating rod of the manually controlled valve for determining the position of the valve.

Like reference characters denote corresponding parts throughout the several views of the drawings, and referring to the same, 1 denotes the frame of an automobile structure provided with the dash board 2, the usual steering shaft 3, extending therethrough, which shaft is operated by the hand wheel 4, and mounted at the forward end of the frame 1 is the usual radiator 5 having arranged at the top thereof the tube 6 provided with the cap 7. The engine hood is designated 10 and within which is mounted the engine construction 11, here shown as the four cylinder type, provided with the usual water cooling pipe 12 connecting the water jackets of the engine 11 with the radiator 5, in the usual manner. The engine 11 being also provided with the usual exhaust pipe 13, and positioned in proximity to the engine 11 is the carbureter 14 having connected thereto the fuel supply pipe 15 for connecting the same with the manifold intake pipes 16, 16 of the engine 11.

Connected to the main supply pipe 15 in any suitable manner is the auxiliary supply pipe 17 provided with the screw threaded union 18. Connected to the union 18 of the auxiliary supply pipe 17 is the automatic valve housing 20 provided with the screw threaded nipple 21 for engaging the threaded union 18 to form a fixed connection thereat. The housing 20 is provided with the passage 22 at one end and with the chamber 23 at the opposite end thereof. At approximately the juncture of the passage 22 and the chamber 23 is arranged the valve seat 24 and into which is seated the valve 25, the valve being provided with the elongated stem 26 extending well within the chamber 23 and having arranged at the extremity thereof the head or nut 27 for retaining the washer 28 upon the stem 26 and against which one end of the spring 29 is adapted to bear, the opposite end of the spring 29 being seated within the annular recess 30 formed within the end wall of the chamber 23 adjacent the valve seat 24. The walls of the valve seat being outwardly flared and extending for a distance beyond the normal seat of the valve to provide the bell shaped compartment 30' into which the passage 22 enters, this compartment being designed to provide for the ready passage of the vapor or heated air around the valve when the same is unseated, due to the suction of the engine or other means for unseating the same. The valve 25 being so positioned within the housing that the same is capable of operating in the direction of the flow of the vapor or air and against the tension of the spring 29, the same being designed to retain the valve 25 in its normal seated position.

Arranged at the end of the housing 20 and opposite to the auxiliary pipe 17 is the three-way valve casing 31 connected to the housing 20 through the means of the pipe connection 32, and in which casing is the three-way valve 34 having connected to one of its ends the operating rod or stem 35. Tapping the valve casing 31 at any suitable point as at 36 is the hot air inlet pipe 37 tapping the exhaust pipe 13 of the engine as at 38, and also tapping the valve casing 31 and at a suitable point for conjoined action with the inlet pipe 37 as at 39 is the vapor inlet pipe 40 which pipe is designed to pass through the inner wall of the radiator 5 and to project upwardly into the tube or stem 6 and slightly removed from the interior of the cap 7 of the radiator 5 as shown at 41. This construction of the vapor pipe 40 being so designed as to enter the upper portion of the radiator at a point where the steam or vapor from the heated water therein collects and designed to convey the vapor to the three-way valve casing 31.

The three-way valve 34 is preferably cylindrical and is provided intermediate of its ends with the radial ports 32', 37' and 40', the ports 37' and 40' being the same size and approximately twice the diameter of the passages through the pipes 37 and 40 the port 32' being approximately three times the diameter of the passage through the pipe 32, (see Figs. 2, 3, 4, and 5.) The position of the valve in Fig. 2 illustrates the ports of the valve 34 in registration and connecting the heated air pipe 37, the vapor pipe 40 and the pipe 32 leading into the chamber 23 of the automatic valve housing 20 and in this position the heated air passes from the exhaust pipe 13 through the pipe 37, the port 37' and through the port 32' into the valve chamber 23. The vapor from the upper portion of the radiator 5 is conducted through the pipe 40, the port 40' and through the port 32' thence to the valve chamber 23 and in this position of the valve the heated air and the vapor unite at the juncture of the port 37' and the port 40' and are thereby commingled before the same are passed into the valve chamber 23. In Fig. 3 the valve 34 is shown as being sufficiently rotated to close the heated air pipe 37, and in this position only the vapor from the radiator is transmitted into the valve chamber 23. In Fig. 4 the valve 34 is shown in the position for closing the vapor pipe 40 and connecting the heated air pipe 37 with the pipe 32 for transmitting the heated air into the chamber 23 and the view shown in Fig. 5 illustrates the valve as being rotated in a position for closing the passages of the pipes 32 and 37 and 40 for preventing the admission of either the heated air or vapor should the condition of the fuel charge require these omissions.

The valve 34 has its operating stem 35 sufficiently elongated that the extremity of the same may be passed through the dash-board 2 and the indicator plate 45 arranged upon the inner side of the dash-board 2 and through the upper portion of the indicator plate, the end of the operating stem 35 of the valve 34 is provided with the crank arm 46 which is provided at the end thereof with the handle 47 having arranged therein the plug 48 for engaging the apertures 49 arranged at the lower end of the indicator plate 45, the plug 48 being outwardly directed by the compression spring 50 within the handle 47 and surrounding the stem 52 of the plug 48 the stem projecting outwardly of the handle 47 and is provided at the free end thereof with the knob 51 designed to be grasped by the hand for releasing the plug 48 from its engagement with the apertures 49 when it is desired to revolve the rod 35 for actuating the threeway valve 34 as shown in Fig. 6. It is to be understood that the indicator plate 45 at the inner side of the dash board 2 is provided with a series of apertures 49 corresponding to the variations of the position of the valve 34 as shown in Figs. 2, 3, 4 and 5 only one of the apertures being shown in Fig. 6, the operation and construction of which being obvious from the view shown in Fig. 6.

The operation of my device is deemed to be obvious in view of the foregoing description of the same. However, it is deemed expedient to here state that in the operation of my device the three-way valve 34 is manually set to admit either the vapor, heated air or both, or the valve may be set to prevent the admission of both the vapor and the heated air. When the valve 34 has been positioned for the admission of the vapor or heated air the same is adapted to enter the valve chamber 23 and the vapor and air are designed to pass through the valve seat 24 and the housing 20 and into the pipe 17 leading to the supply pipe 15, the progress of the vapor and air being controlled by the automatic valve 26, the valve being constructed in a manner for unseating the same when suction is created in the fuel supply pipes by the engine and also adapted for the ready return to its seat for preventing the passage of the fuel charge rearwardly and beyond the automatic valve and into the chamber 23 of the housing 20, and by its construction the density of the fuel charge may be readily controlled as well as to provide for a great saving in fuel as well as to eliminate the deleterious effects resulting from carbonization due to use of impure and improperly mixed fuel charges.

While I have here shown the preferred form of my invention I hereby reserve the right to make such alterations and variations therein as I may deem expedient from time to time and which will not depart from the spirit of the invention or conflict with the scope of the appended claims.

Having thus fully described my invention what I claim as new, and desire to secure by Letters Patent is:

1. A device of the class described, in combination with a combustion engine, the radiator, the exhaust pipe, and the fuel intake pipe for said engine, of a housing connected to said fuel intake pipe, a valve casing associated with said housing, a vapor pipe connecting said valve casing with the radiator of the engine, a hot air pipe connecting said valve casing with the exhaust pipe of the engine, and a manually controlled three-way valve within said valve casing for establishing communication between the respective vapor and hot air pipes and said housing for regulating the degree of humidity of the fuel charge.

2. A device of the class described, in combination with a combustion engine, the radiator, the exhaust pipe, and the fuel intake pipe for said engine, of a housing connected to said fuel intake pipe, a valve casing associated with said housing, a vapor pipe connecting said valve casing with the radiator of the engine, a hot air pipe connecting said valve casing with the exhaust pipe of the engine, a manually controlled three-way valve within said valve casing for establishing communication between the respective vapor and hot air pipes and said housing for regulating the degree of humidity of the fuel charge, and an automatic valve within said housing actuated by the suction of the engine for supplying the regulating medium to the fuel charge.

3. A device of the class described, in combination with a combustion engine, the radiator, the exhaust pipe, and the fuel intake pipe for said engine, of a housing connected to said fuel intake pipe, a check valve within said housing, a valve casing formed with said housing, a vapor pipe connecting said valve casing with the radiator of the engine, a hot air pipe connecting said valve casing with the exhaust pipe of the engine, a rotary valve within said valve casing for establishing communication between the respective vapor and hot air pipes and said housing for regulating the degree of humidity of the fuel charge, and a rod secured to said rotary valve along its horizontal axis for operating said valve.

4. A device of the class described, in combination with a combustion engine, the radiator, the exhaust pipe, and the fuel intake pipe for said engine, of a housing connected to said fuel intake pipe, a check valve within said housing, a valve casing formed integrally with said housing, a vapor pipe connecting said valve casing with the radiator of the engine, a hot air pipe connecting said valve casing with the exhaust pipe of the engine, a rotary valve within said valve casing for establishing communication between the respective vapor and hot air pipes and said housing for regulating the degree of humidity of the fuel charge, a rod for adjusting said rotary valve, and means for locking said rod against movement for retaining said rotary valve in its relative adjusted position.

5. A device of the class described, in combination with a combustion engine, the radiator, the exhaust pipe, and the fuel intake pipe for said engine, of a housing connected to said fuel intake pipe, a check valve within said housing, a valve casing formed integrally with said housing, a vapor pipe connecting said valve casing with the radiator of the engine, a hot air pipe connecting said valve casing with the exhaust pipe of the engine, a rotary valve within said valve casing for establishing communication between the respective vapor and hot air pipes and said housing for regulating the degree of humidity of the fuel charge, a rod for adjusting said rotary valve, and means for locking said rod against movement for retaining said rotary valve in its relative adjusted position, said locking means also for indicating the position of said rotary valve.

In testimony whereof I have signed my name to this specification in the presence of two subscribing witnesses.

ALBERT ROSS UMBARGER.

Witnesses: